United States Patent
Hendriks

(10) Patent No.: US 7,292,324 B2
(45) Date of Patent: Nov. 6, 2007

(54) SPHERICAL ABERRATION DETECTION

(75) Inventor: Bernardus Hendrikus Wilhemus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 339 days.

(21) Appl. No.: 10/531,937

(22) PCT Filed: Oct. 1, 2003

(86) PCT No.: PCT/IB03/04355

§ 371 (c)(1),
(2), (4) Date: Apr. 19, 2005

(87) PCT Pub. No.: WO2004/038707

PCT Pub. Date: May 6, 2004

(65) Prior Publication Data

US 2006/0083510 A1     Apr. 20, 2006

(30) Foreign Application Priority Data

Oct. 23, 2002   (EP)   .................................. 02292625

(51) Int. Cl.
*G01J 1/00*     (2006.01)
*G01B 9/00*     (2006.01)

(52) U.S. Cl. ...................................... 356/123; 356/125
(58) Field of Classification Search ................ 356/123, 356/125
See application file for complete search history.

(56) References Cited

U.S. PATENT DOCUMENTS 6,229,600 B1 *  5/2001  Martynov .................... 356/123

* cited by examiner

*Primary Examiner*—Gregory J. Toatley, Jr.
*Assistant Examiner*—Amanda H Merlino

(57) ABSTRACT

The invention relates to an optical device in which a spherical aberration is detected. The optical device comprises means (206, 208) for focussing a first radiation beam (203) having a first numerical aperture and a second radiation beam (204) having a second numerical aperture lower than the first numerical aperture, on an information carrier (200). The optical device further comprises means (211) for detecting a first focus error signal corresponding to the first radiation beam and a second focus error signal corresponding to the second radiation beam. In order to measure the spherical aberration of the first radiation beam, due to a variation of the cover layer thickness of the information carrier, the optical device comprises means (212) for measuring a spherical aberration of the first radiation beam from the first and second focus error signals.

8 Claims, 4 Drawing Sheets

# US 7,292,324 B2

SPHERICAL ABERRATION DETECTION

FIELD OF THE INVENTION

The present invention relates to an optical device comprising means for detecting a spherical aberration.

The present invention also relates to a method for detecting a spherical aberration.

The present invention is particularly relevant for an optical disc apparatus for reading and/or recording data from and/or to an optical disc, e.g. a CD, a DVD or a Blu-Ray Disc (BD) player and/or recorder.

BACKGROUND OF THE INVENTION

An optical device comprising means for detecting a spherical aberration is known from Applicant's U.S. Pat. No. 6,229,600. The invention described in this patent aims at providing a detection system for detecting a spherical aberration. Such a detection system is used in an optical device comprising means for focussing a radiation beam on an information carrier. Information carriers are often scanned through a transparent layer protecting an information layer. A small variation of the thickness of the transparent layer causes a substantial change in the spherical aberration incurred by a high-numerical aperture radiation beam traversing the transparent layer. This spherical aberration might be reduced, by using, for example, a dual lens objective, as described in U.S. Pat. No. 6,229,600. But the amount of spherical aberration might be determined in order to be able to reduce the spherical aberration.

FIG. 1 illustrates how the spherical aberration is detected in an optical device, according to U.S. Pat. No. 6,229,600. The optical device comprises a radiation source 101 controlled by a driver 113, a collimator lens 102, an objective lens 103, a plano-convex lens 104, a beam-splitter 105, two detectors 106 and 107, a signal processor 108, an adder 109, an amplifier 110, and two servo controllers 111 and 112. This optical device is intended for scanning an information carrier 100.

The radiation source 101 produces a radiation beam, which is focussed on an information layer of the information carrier 100 thanks to the collimator lens 102 and the objective lens 103. The radiation beam is reflected by the information layer and is transformed to a converging radiation beam by the objective lens 103 and the collimator lens 102. Part of this converging radiation beam incident on a central zone of the beam splitter 105 is deflected towards detector 106 and part of this converging radiation beam incident on an outer zone of the beam splitter 105 is deflected towards detector 107. The signal detected by detectors 106 and 107 allows the signal processor 108 to provide focus error signals corresponding to the inner part and the outer part of the reflected radiation beam.

The signal processor 108 also determines the spherical aberration of the radiation beam by subtracting these two focus error signals.

Knowing the focus error signals, the servo controller 111 drives an actuator controlling the axial position of the objective lens 103 in order to correct the focus error. Knowing the spherical aberration, the servo controller 112 drives an actuator controlling the axial position of the plano-convex lens 104 in order to correct the spherical aberration.

A disadvantage of the optical device described above lies in the fact that it requires a special beam splitter 105, which makes the optical device bulky and complicated. Another disadvantage lies in the fact that it requires two detectors, which make the optical device bulky and complicated, as these two detectors require a different readout channel, comprising different associated electronics.

SUMMARY OF THE INVENTION

It is an object of the invention to provide an optical device comprising simplified means for detecting a spherical aberration.

To this end, the invention proposes an optical device comprising means for focussing a first radiation beam having a first numerical aperture and a second radiation beam having a second numerical aperture different from the first numerical aperture, on an information carrier, means for detecting a first focus error signal corresponding to the first radiation beam and a second focus error signal corresponding to the second radiation beam, and means for measuring a spherical aberration of the first radiation beam from the first and second focus error signals.

The invention is based on the recognition that, in a radiation beam having spherical aberration, the rays in the centre of the beam and the rays at the periphery of the beam have different focal points, when focussed on an information carrier. The difference between the positions of the focal points provides a measure of the spherical aberration. Now, the rays in the centre of the beam have a numerical aperture which is lower than the numerical aperture of the rays at the periphery of the beam. As a consequence, a measurement of the spherical aberration can be obtained by detecting the difference in the positions of the focal points of two radiation beams having different numerical apertures, these two radiation beams being focussed on the information carrier. Thus, no beam-splitter is needed in such an optical device, which simplifies the device.

In a preferred embodiment, the first and second radiation beams are produced by two radiation sources, the device further comprises means for switching on and off the radiation beams, and the first and second focus error signals are detected by a same detector. According to this embodiment, two radiation sources are used in order to produce the two radiation beams having different numerical apertures. One of the radiation beams, for example a blue laser, is used to scan an information layer, for example a Blu-ray disc, the other radiation beam, which is for example intended to scan a DVD, is used to provide a measurement of the spherical aberration. For example, before scanning a disc, the first radiation beam is switched off and the second radiation beam is switched on, a measurement of the focus error signal of the second radiation beam and then of the spherical aberration is performed, after which the second radiation beam is switched off and the first radiation beam is switched on in order to scan the information layer. As the two radiation beams are switched on separately in time, a same detector is used to detect the focus error signals corresponding to the two radiation beams. As a consequence, the optical device is simplified.

Advantageously, the optical device further comprises means for pulsing the second radiation beam and means for detecting a pulsed focus error signal corresponding to said pulsed second radiation beam. This allows increasing the signal to noise ratio, and thus leads to a more accurate measurement of the spherical aberration.

In an advantageous embodiment, the first and second radiation beams are produced by a same radiation source, the optical device further comprises means for reducing the numerical aperture of the first radiation beam in order to obtain the second radiation beam, and means for switching on and off said reducing means. According to this embodiment, the second radiation beam, which is used for measuring the spherical aberration, is part of the first radiation beam. This embodiment is advantageously used in optical devices, where only one radiation source is available.

Advantageously, a liquid crystal cell is placed between the radiation source and the focussing means in order to reduce the numerical aperture of the first radiation beam. Such a liquid crystal cell is easily and rapidly switchable, thanks to electric fields. As a consequence, constructing the second radiation beam from the first radiation beam is easy. Moreover, the liquid crystal cell can be switched on and off in a pulsed way, which leads to a pulsed second radiation beam, thus improving the signal to noise ratio.

The invention also relates to a method for detecting a spherical aberration, said method comprising the steps of detecting a first focus error signal corresponding to a first radiation beam having a first numerical aperture, detecting a second focus error signal corresponding to a second radiation beam having a second numerical aperture different from the first numerical aperture, and measuring a spherical aberration of the first radiation beam from the first and second focus error signals.

Advantageously, the step of measuring a spherical aberration of the first radiation beam from the first and second focus error signals is performed by calculating the difference between the first focus error signal and the second focus error signal, and subtracting a predefined focus error signal from said difference, said predefined focus error signal corresponding to a focus error signal obtained with the second radiation beam focussed on an information carrier having a predetermined thickness.

In order to obtain an accurate measurement of the spherical aberration due to the variation of the cover layer thickness of the information carrier, a predefined focus error signal is taken into account, which corresponds to a focus error signal obtained with the second radiation beam focussed on an information carrier having a predetermined thickness. Actually, even with an information carrier having a predefined perfect cover layer thickness, the second radiation beam has a focus error, because the information carrier is intended to be read by the first radiation beam. This predefined focus error signal might be determined during a manufacturing process, and loaded in a memory of the optical device, in order to be subtracted from the difference between the first focus error signal and the second focus error signal.

These and other aspects of the invention will be apparent from and elucidated with reference to the embodiments described hereinafter.

BRIEF DESCRIPTION OF THE DRAWINGS

The invention will now be described in more detail, by way of example, with reference to the accompanying drawings, in which.

DETAILED DESCRIPTION OF THE INVENTION

Figure 1:
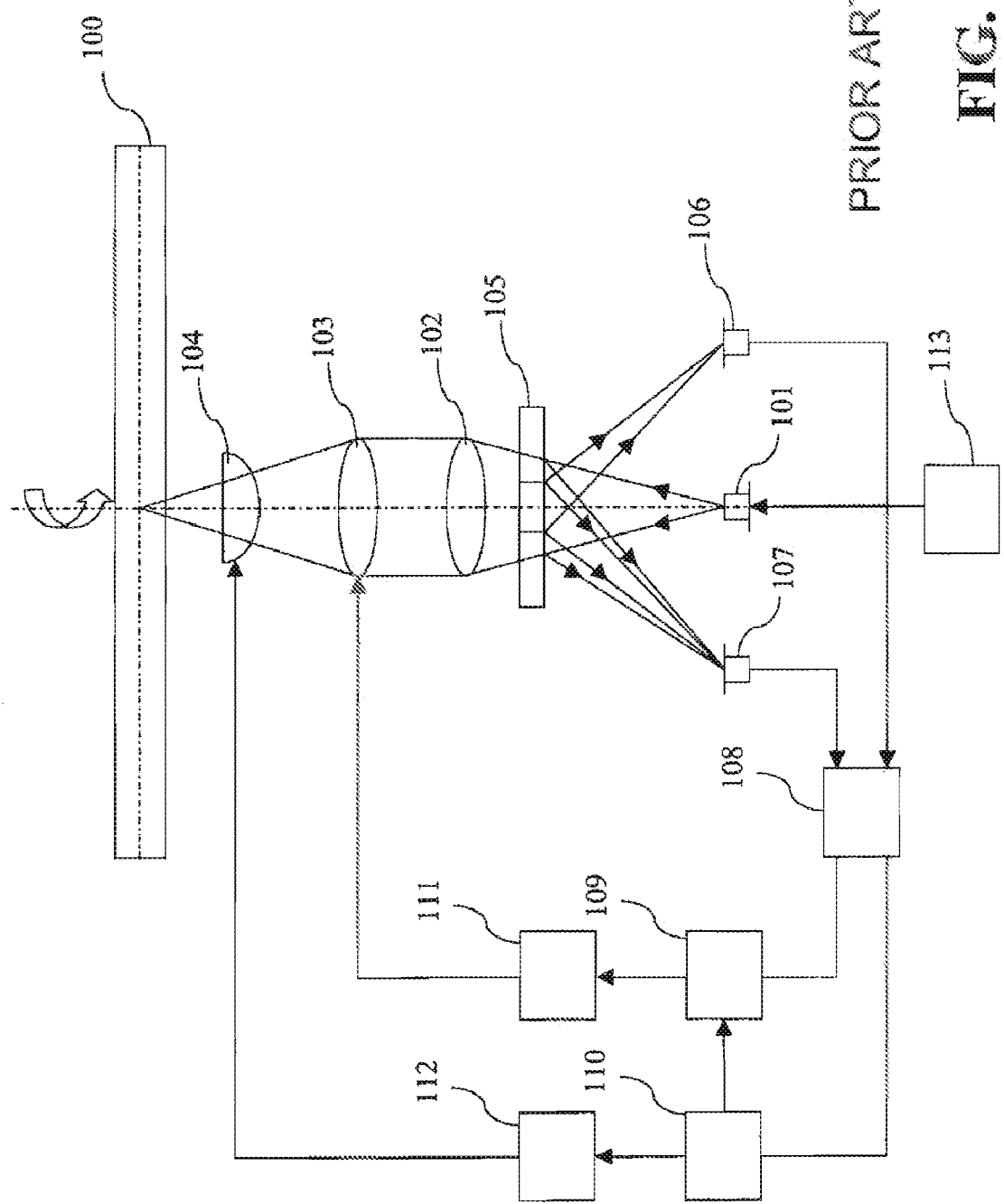
FIG. 1 shows an optical device in accordance with the background art.
Figure 2:
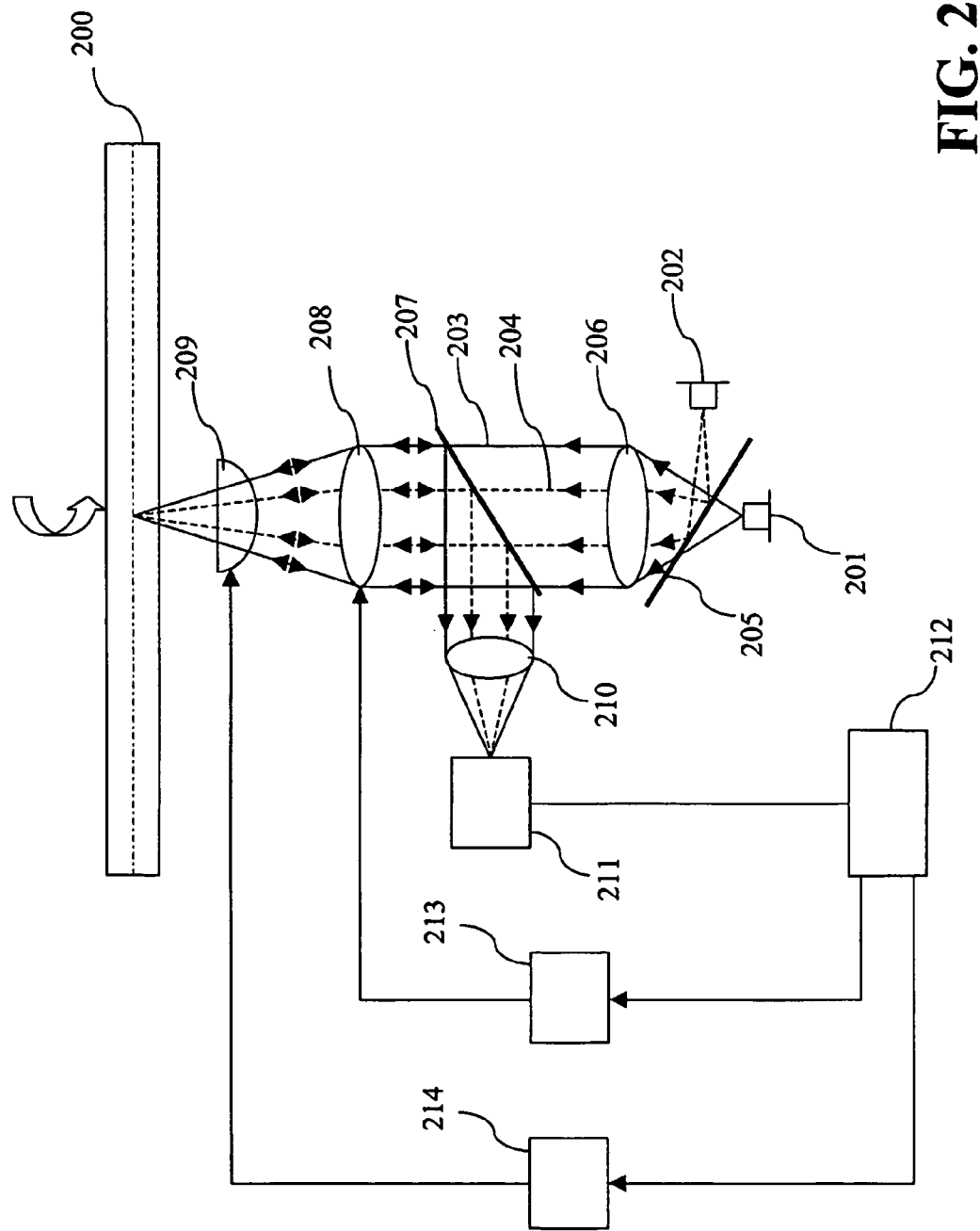
FIG. 2 shows an optical device in accordance with a preferred embodiment of the invention.

An optical device according to a preferred embodiment of the invention is depicted in FIG. 2. Such an optical device comprises a first radiation source 201 for producing a first radiation beam 203, a second radiation source 202 for producing a second radiation beam 204, a first beam splitter 205, a collimator lens 206, a second beam splitter 207, an objective lens 208, a plano-convex lens 209, a servo lens 210, detecting means 211, measuring means 212 and two servo controllers 213 and 214. This optical device is intended for scanning an information carrier 200.

In the example described hereinafter, the information carrier 200 is a Blu-ray disc comprising an information layer. During a scanning operation, this Blu-ray disc is scanned by the first radiation beam 203 produced by the first radiation source 201. The first radiation beam 203 has a first wavelength equal to 405 nanometres. The collimator lens 206 and the objective lens 208 focus the first radiation beam 203 on the information layer of the information carrier 200. The collimator lens 206 and the objective lens 208 are focussing means. The numerical aperture of the first radiation beam is 0.85. During a scanning operation, a first focus error signal might be detected, corresponding to the first radiation beam 203. This first focus error signal might be used to correct the axial position of the objective lens 208 in order to compensate for a focus error signal of the first radiation beam 203. A signal is sent to the servo controller 213, which drives an actuator in order to move the objective lens 208 axially.

The first focus error signal is detected by the detecting means 211. The first radiation beam 203, reflected by the information carrier 200, is transformed to a parallel beam by the objective lens 208, and then reaches the servo lens 210, thanks to the second beam splitter 207. This reflected beam then reaches the detecting means 211, which detects a first focus error signal, based on any focus detection method known in the art. For example, the astigmatic focus detection method or the Foucault detection method might be used. These focus detection methods are described, for example, in U.S. Pat. No. 6,229,600. It should be noted that the detecting means 211 are preferably placed in the optical device by using a first radiation beam 203 without spherical aberration. In order to place the detecting means, a 'perfect' disc having a calibrated cover layer thickness of 100 micrometers is used.

How the spherical aberration caused by a variation of the cover layer thickness compared to the calibrated cover layer thickness is measured, is described hereinafter. Such a measurement might be performed when a new disc is introduced in the optical device. The first radiation beam 203 is switched off, for example by switching off the first radiation source 201. The second radiation beam 204 is then switched on. This second radiation beam 204 is sent to the collimator lens 206, thanks to the first beam splitter 205. The second radiation beam 204 is then transformed to a parallel beam by the collimator lens 206 and focussed on the information carrier 200, thanks to the objective lens 208. The numerical aperture of this second radiation beam 204 is 0.65 and the wavelength of the second radiation beam 204 is 650 nanometres. This second radiation beam 204 is usually used for scanning a DVD.

The second radiation beam 204, reflected by the information carrier 200, is transformed to a parallel beam by the objective lens 208 and then reaches the servo lens 210, thanks to the second beam splitter 207. This reflected beam then reaches the detecting means 211, which detects a second focus error signal, as described above for the first radiation beam 203.

Then, the measuring means 212 performs a difference between the first focus error signal and the second focus error signal. This difference is a measurement of the spherical aberration of the first radiation beam 203, due to the variation in the cover layer thickness. Actually, as explained in U.S. Pat. No. 6,229,600, the spherical aberration of a radiation beam might be measured by computing the difference between the focus error signal corresponding to a peripheral part of the radiation beam and the focus error signal corresponding to an inner part of the radiation beam. In this invention, the second radiation beam 204, which has a lower numerical aperture than the first radiation beam 203, plays the role of the inner part of the first radiation beam 203. As a consequence, performing a difference between the first focus error signal and the second focus error signal allows measuring the spherical aberration of the first radiation beam 203.

It should be noted that the measurement of the second focus error signal and the first focus error signal are preferably performed at short intervals. Actually, it is possible that the focus error signal of a given radiation beam is different from one place of a disc to another place, due to defaults of the disc. As the disc rotates when the focus error signals are detected, it is preferable to measure the focus error signals of the first and second radiation beams 203 and 204 when the disc is substantially at the same place, so that the measurement of the spherical aberration is not affected by defaults of the disc.

It should also be noted that a more accurate measurement of the spherical aberration of the first radiation beam 203 might be performed. Actually, when the second radiation beam 204 is focussed on a 'perfect' information carrier having a calibrated cover layer thickness, this second radiation beam 204 has a focus error, because the optical device is optimised for the wavelength of the first radiation beam 203, which differs from the wavelength of the second radiation beam 204. As a consequence, a predefined focus error signal might be detected during a manufacturing process, corresponding to the second radiation beam 204 focussed on an information carrier having a calibrated cover layer thickness. This predefined focus error signal might be stored in a memory of the measuring means 212. Then, in order to obtain an accurate measurement of the spherical aberration of the first radiation beam 203, this predefined focus error signal is subtracted from the difference between the first focus error signal and the second focus error signal.

Advantageously, the second radiation beam 204 is pulsed. This might be achieved by pulsing the second radiation source 202. The second radiation beam 204 is pulsed at a known pulsing frequency. As a consequence, the second focus error signal is a pulsed signal having a known frequency. This pulsed signal is then detected by the detecting means 211, which comprise means for detecting a signal at the pulsing frequency. For example, a synchronous detection might be performed in order to obtain the second focus error signal. This allows increasing the signal to noise ratio, which leads to a more accurate measurement of the spherical aberration of the first radiation beam 203.

It should be noted that the means for switching on and off the two radiation beams are not limited to what has been described hereinbefore, that is to say switching on and off the two radiation sources. For example, a filter might be used before the detecting means 211. This filter is able to select one of the two radiation beams, based on the wavelengths of these radiation beams. Then, in order to measure the spherical aberration, the filter is activated in such a way that it transmits the second radiation beam 204 and stops the first radiation beam 203.

The measurement of the spherical aberration is then used in order to correct the spherical aberration of the first radiation beam 203. This spherical aberration, which arises when the first radiation beam 203 is focussed through a cover layer, the thickness of which is different from the design thickness of this layer, is compensated by changing the axial position of the plano-convex lens 209. The measuring means sends a signal to the servo controller 214, which signal corresponds to the spherical aberration. The servo controller 214 then drives an actuator, in order to change the position of the plano-convex lens 209. This change causes the plano-convex lens 209 to produce, due to the changing magnification, an amount of spherical aberration which compensates the spherical aberration produced by the variation in the cover layer thickness.

It should be noted that other means for compensating the spherical aberration might be used. For example, by shifting the position of the collimator lens 206, the conjugate of the first radiation beam 203 is varied, inducing spherical aberration in the objective lens 208, which can be used for compensating for spherical aberration due to variations in cover layer thickness. This is detailed in "Optical Pick-Up for blue optical recording at NA=0.85", written by B. H. W. Hendriks et al., published in the Optical Review volume 8, page 211 to 213, in 2001.

Figure 3:
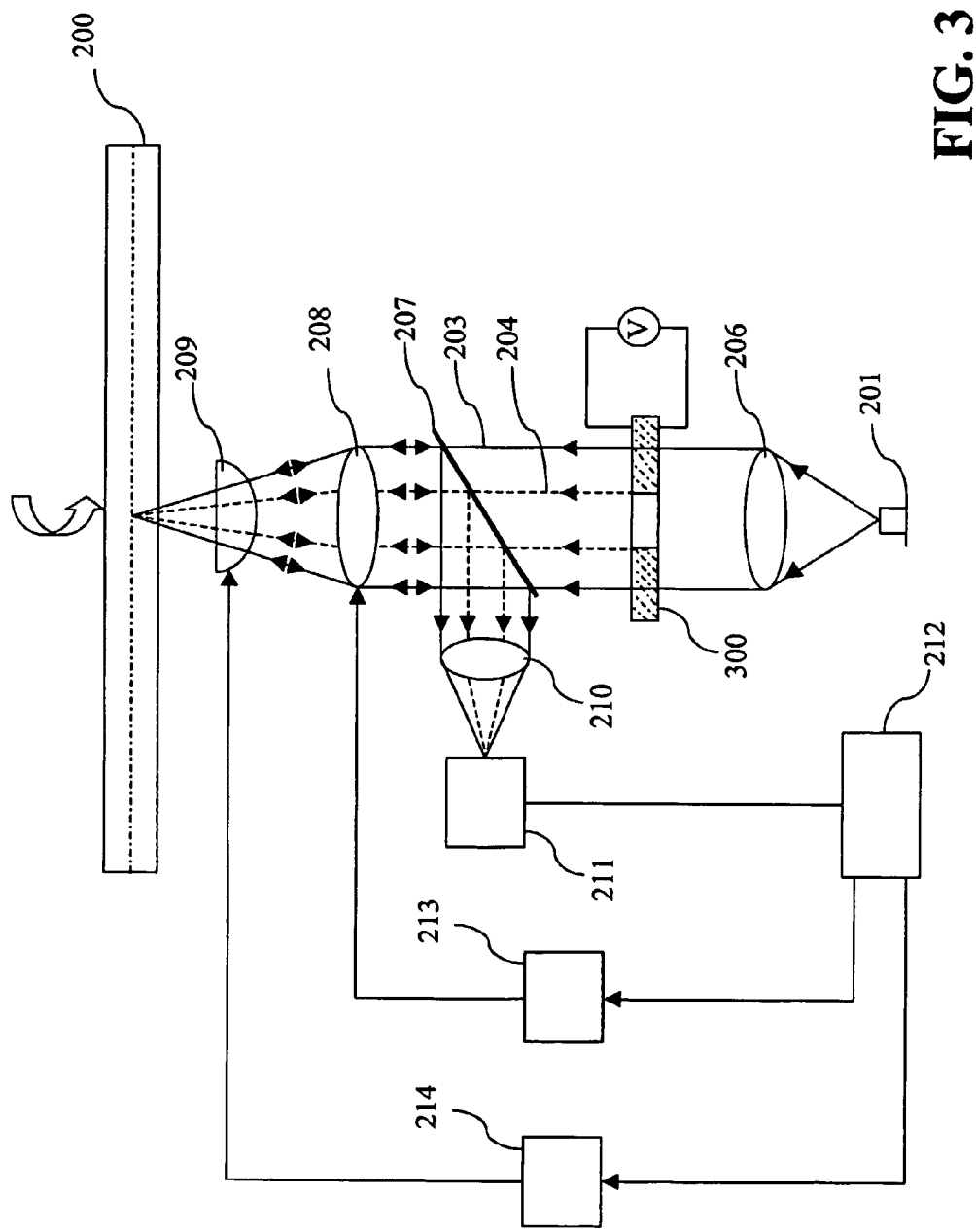
FIG. 3 shows an optical device in accordance with an advantageous embodiment of the invention.

An optical device according to an advantageous embodiment of the invention is depicted in FIG. 3. According to this embodiment, the second radiation beam 204 is produced from the first radiation beam 203, thanks to a liquid crystal cell 300. The first radiation beam 203 and the second radiation beam 204 are thus produced from the same radiation source 201. This means that the first and second radiation beams 203 and 204 have the same wavelength, but, as explained hereinafter, have different numerical apertures.

The second radiation beam 204 is obtained from the first radiation beam 203 by applying a voltage to the liquid crystal cell 300, which is placed between the collimator lens 206 and the objective lens 208. When no voltage is applied to the liquid crystal cell 300, the whole beam incident on the liquid crystal cell 300 is transmitted. When a voltage is applied to the liquid crystal cell 300, only an inner part of the beam incident on the liquid crystal cell 300 is transmitted. This means that the liquid crystal cell allows for reducing the numerical aperture of the first radiation beam 203.

As a consequence, when a scanning operation is performed, in which the information carrier has to be scanned by the first radiation beam 203, no voltage is applied to the liquid crystal cell 300. This is the same when the first focus error signal corresponding to the first radiation beam 203 is detected. When the spherical aberration has to be measured, for example when a new disc is inserted inside the optical device, a voltage is applied to the liquid crystal cell 300, and the second focus error signal is thus detected.

It should be noted that the second radiation beam 204 might be pulsed by applying an alternative voltage to the liquid crystal cell 300. In this case, the pulsing frequency is the frequency of the alternative voltage. As described above, this allows increasing the signal to noise ratio.

Figure 4:
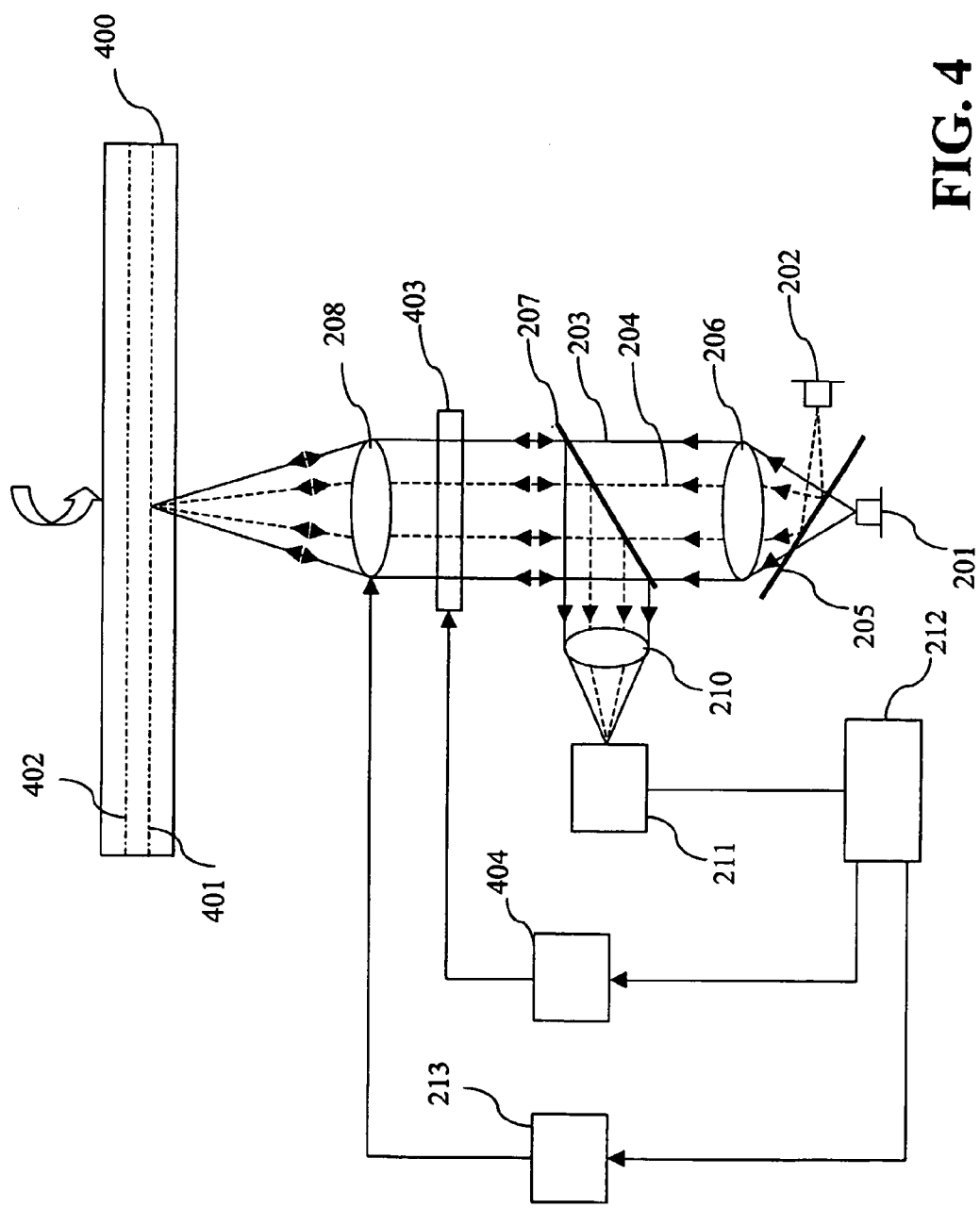
FIG. 4 shows an optical device in accordance with another embodiment of the invention.

The description above illustrates rather than limits the invention. Actually, the invention is not limited to the optical devices as shown in FIGS. 2 and 3. Other optical devices might be based on the invention, in which two radiation beams having different numerical apertures are used in order to obtain a measurement of the spherical aberration. For example, the invention might be used in an optical device as shown in FIG. 4.

Such a device is intended for scanning a multilayer information carrier 400. In this example, the multilayer information carrier 400 has two layers 401 and 402. The optical device can scan one layer or the other, by changing the axial position of the objective lens 208, thanks to the servo controller 213. But the amounts of information carrier material traversed by the first radiation beam 203 are different when the first radiation beam 203 is focussed on the information layer 401 or on the information layer 402. As a consequence, the spherical aberration introduced in the first radiation beam 203 by the information carrier changes from one information layer to another. These changes are compensated by a spherical-aberration compensator 403, which is placed between the collimator lens 206 and the objective lens 208. The spherical-aberration compensator imparts a phase shift to the wavefront of the first radiation beam 203, which phase shift depends on the position in the wavefront.

The spherical aberration is first measured, as described in the description of FIG. 2. Then a signal corresponding to the spherical aberration is sent to a servo controller 404, which commands properties of the phase shift imparted by the spherical-aberration compensator 403, depending on the amount of spherical aberration. The spherical-aberration compensator 403 might be a deformable folding mirror or a liquid crystal cell.

Any reference sign in the following claims should not be construed as limiting the claim. It will be obvious that the use of the verb "to comprise" and its conjugations does not exclude the presence of elements other than those defined in any claim. The word "a" or "an" preceding an element does not exclude the presence of a plurality of such elements.

The invention claimed is:

1. An optical device comprising:
   means (206, 208) for focussing a first radiation beam (203) having a first numerical aperture and a second radiation beam (204) having a second numerical aperture different from the first numerical aperture, on an information carrier (200);
   means (211) for detecting a first focus error signal corresponding to the first radiation beam and a second focus error signal corresponding to the second radiation beam;
   means (212) for measuring a spherical aberration of the first radiation beam from the first and second focus error signals.

2. An optical device as claimed in claim 1, wherein the first and second radiation beams are produced by two radiation sources (201, 202), the device further comprising means for switching on and off the radiation beams, the first and second focus error signals being detected by a same detector.

3. An optical device as claimed in claim 2, further comprising means for pulsing the second radiation beam and means for detecting a pulsed focus error signal corresponding to said pulsed second radiation beam.

4. An optical device as claimed in claim 1, wherein the first and second radiation beams are produced by a same radiation source, the optical device further comprising means (300) for reducing the numerical aperture of the first radiation beam in order to obtain the second radiation beam, and means for switching on and off said reducing means.

5. An optical device as claimed in claim 4, wherein a liquid crystal cell is placed between the radiation source and the focussing means in order to reduce the numerical aperture of the first radiation beam.

6. A method for detecting a spherical aberration, said method comprising the steps of:
   detecting a first focus error signal corresponding to a first radiation beam having a first numerical aperture;
   detecting a second focus error signal corresponding to a second radiation beam having a second numerical aperture different from the first numerical aperture;
   measuring a spherical aberration of the first radiation beam from the first and second focus error signals.

7. A method as claimed in claim 6, the step of measuring a spherical aberration of the first radiation beam from the first and second focus error signals being performed by:
   calculating the difference between the first focus error signal and the second focus error signal,
   subtracting a predefined focus error signal from said difference, said predefined focus error signal corresponding to a focus error signal obtained with the second radiation beam focussed on an information carrier having a predetermined thickness.

8. A method as claimed in claim 6, wherein the step of detecting the first focus error signal and the step of detecting the second focus error signal are separated in time.

* * * * *